United States Patent [19]

Okazaki

[11] Patent Number: 5,713,642
[45] Date of Patent: Feb. 3, 1998

[54] ANTISKID BRAKING CONTROL SYSTEM FOR VEHICLES

[75] Inventor: Haruki Okazaki, Hiroshima, Japan

[73] Assignee: Mazda Motor Corporation, Hiroshima-ken, Japan

[21] Appl. No.: 499,252

[22] Filed: Jul. 7, 1995

[30] Foreign Application Priority Data

Jul. 7, 1994 [JP] Japan .................................. 6-180744

[51] Int. Cl.⁶ ...................................................... B60T 8/32
[52] U.S. Cl. ........................... 303/121; 303/157; 303/158; 303/177
[58] Field of Search ........................ 303/121, 159, 303/158, 157, 192, 176, 160, 165, 174, 175, 191, 199, 156, 118.1, 119.2, 113.2, 68–69; 364/426.01, 426.02, 426.03, 426.018; 188/181 A, 181 C; 180/197

[56] References Cited

U.S. PATENT DOCUMENTS

| | | | |
|---|---|---|---|
| 4,753,494 | 6/1988 | Antrobus | 303/68 |
| 4,852,950 | 8/1989 | Murakami | 303/192 |
| 5,257,192 | 10/1993 | Masaki | 303/174 |
| 5,615,932 | 4/1997 | Okazaki | 303/121 |

FOREIGN PATENT DOCUMENTS 4368270  12/1992  Japan .

*Primary Examiner*—Douglas C. Butler
*Attorney, Agent, or Firm*—Sixbey, Friedman, Leedom & Ferguson, P.C.; Gerald J. Ferguson, Jr.; Donald R. Studebaker

[57] ABSTRACT

An antiskid braking system for controlling hydraulic braking pressure to alleviate a lock of wheels so as thereby to control a skid of the wheel and alters the hydraulic braking pressure by repeating at least a pressure reducing phase and a pressure increasing phase so as to render the wheels loose to be locked more for a leading period of time from a commencement of antiskid braking control than for a succeeding period of time of antiskid braking control, or otherwise, if the control of hydraulic braking pressure for the gradual alleviation of the wheel lock is performed in consecutive cycles, in the first cycle of antiskid braking control than in any other remaining cycle.

11 Claims, 15 Drawing Sheets

| | 0 ←―――― Vg ――――→ LARGE | | | | | | | |
|---|---|---|---|---|---|---|---|---|
| 0 | 1.0 | 1.0 | 2.0 | 2.0 | 3.0 | 3.0 | 4.0 | 4.0 | 5.0 |
| ↓ | 1.0 | 1.0 | 2.0 | 2.0 | 3.0 | 4.0 | 4.0 | 5.0 | 5.0 |
| | 1.0 | 1.0 | 2.0 | 3.0 | 3.0 | 4.0 | 4.0 | 5.0 | 5.0 |
| V | 1.0 | 1.0 | 2.0 | 3.0 | 4.0 | 4.0 | 5.0 | 5.0 | 5.0 |
| | 1.0 | 1.0 | 2.0 | 3.5 | 4.0 | 5.0 | 5.0 | 5.0 | 5.0 |
| ↓ | 1.0 | 1.0 | 2.0 | 4.0 | 4.0 | 5.0 | 5.0 | 5.0 | 5.0 |
| | 1.0 | 2.0 | 3.0 | 4.0 | 5.0 | 5.0 | 5.0 | 5.0 | 5.0 |
| LARGE | 1.0 | 2.0 | 3.0 | 5.0 | 5.0 | 5.0 | 5.0 | 5.0 | 5.0 |

FIG. 9

| Fak | Mul | VEHICLE SPEED: Vr | PARAMETER: M |
|---|---|---|---|
| 1 | | HIGH SPEED RANGE | HM 1 |
| | | MODERATE SPEED RANGE | HM 2 |
| | | LOW SPEED RANGE | HM 3 |
| 0 | 3 | HIGH SPEED RANGE | HM 1 |
| | | MODERATE SPEED RANGE | HM 2 |
| | | LOW SPEED RANGE | HM 3 |
| | 2 | HIGH SPEED RANGE | MM 1 |
| | | MODERATE SPEED RANGE | MM 2 |
| | | LOW SPEED RANGE | MM 3 |
| | 1 | HIGH SPEED RANGE | LM 1 |
| | | MODERATE SPEED RANGE | LM 2 |
| | | LOW SPEED RANGE | LM 3 |

FIG. 10

|     |   | B12   | Bsg  | B35 | Bsz  |
|-----|---|-------|------|-----|------|
| HM  | 1 | -1.5G | 95 % | 0G  | 95 % |
| HM  | 2 | -1.5G | 90 % | 0G  | 90 % |
| HM  | 3 | -1.5G | 85 % | 0G  | 85 % |
| MM  | 1 | -1.0G | 95 % | 0G  | 95 % |
| MM  | 2 | -1.0G | 90 % | 0G  | 90 % |
| MM  | 3 | -1.0G | 85 % | 0G  | 85 % |
| LM  | 1 | -0.5G | 95 % | 0G  | 95 % |
| LM  | 2 | -0.5G | 90 % | 0G  | 90 % |
| LM  | 3 | -0.5G | 85 % | 0G  | 85 % |

FIG. 11

| Mul | Fak | θ     | B12        | Bsg        | B35 | Bsz        |
|-----|-----|-------|------------|------------|-----|------------|
| 1, 2 |    | < 90° | B12        | Bsg        | B35 | Bsz        |
|     |     | ≥ 90° | B12        | Bsg + 5 %  | B35 | Bsz + 5 %  |
| 3   | 0   | < 90° | B12        | Bsg        | B35 | Bsz        |
|     |     | ≥ 90° | B12        | Bsg + 5 %  | B35 | Bsz + 5 %  |
|     | 1   | < 90° | B12 - 1.0G | Bsg - 5 %  | B35 | Bsz - 5 %  |
|     |     | ≥ 90° | B12 - 1.0G | Bsg        | B35 | Bsz        |

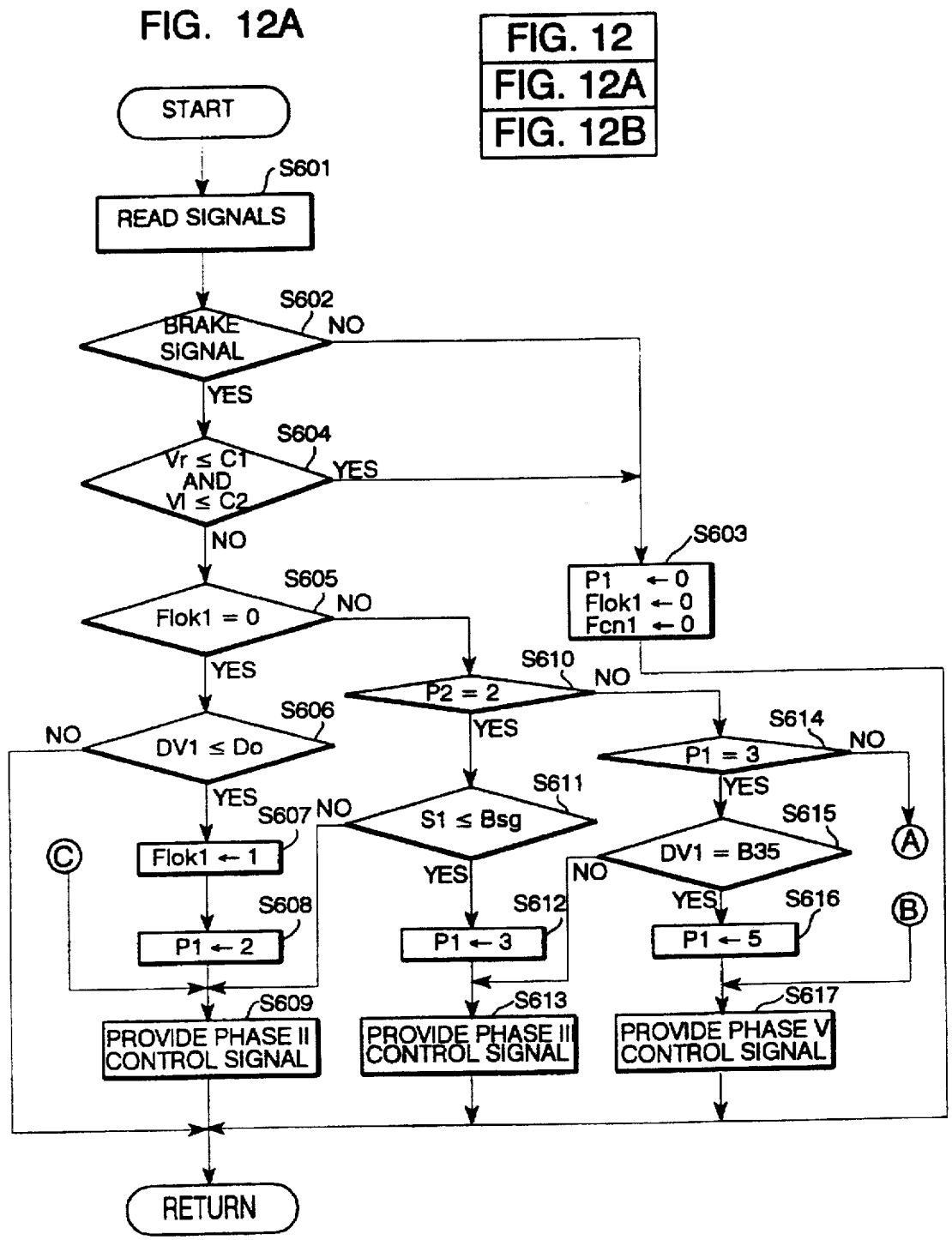

ANTISKID BRAKING CONTROL SYSTEM FOR VEHICLES

BACKGROUND OF THE INVENTION

1. Field of the Invention

The present invention relates to an antiskid braking control system which can provide alleviation of nose-dive of a car during braking and alleviation of pitching of a car during antiskid braking control.

2. Description of Related Art

In order for brake systems to alleviate wheel locking during braking so as to assure reliable braking, there have been widely used various kinds of antiskid braking systems which control hydraulic braking pressure according to vehicle speed and wheel speed. Such an antiskid braking system cooperates with hydraulic pressure control systems associated with brake assemblies of four wheels, at least three or otherwise four, of which include regulating valves, such as intensifying valve and reducing valves, for controlling hydraulic braking pressure so as to allow the wheels to get target slippage. In the antiskid braking system, it is typical to repeat the control of hydraulic braking pressure in a predetermined pattern, such as including pressure increasing, increased pressure holding, pressure reducing and reduced pressure holding, or otherwise including pressure increasing and pressure reducing, several times during antiskid braking.

One such antiskid braking system is that described in Japanese Unexamined Patent Publication No. 4-368270. The antiskid braking system is to use threshold values of parameters, such as wheel slippage and the speed of brake application, necessary for the control of antiskid braking which is altered so that the antilock control is rendered susceptible for a predetermined leading period of time from the commencement of braking and solid thereafter.

The antiskid braking system as described in the above publication may have advantages such that the antilock control is effected, on one hand, quickly so as to prevent a sharp increase in hydraulic braking pressure during abrupt braking on roads of low surface friction and delayed, on the other hand, so as to eliminate a deficiency of hydraulic braking pressure during braking on roads of high surface friction and that the antilock control is performed according to circumstances of brake application.

Nevertheless, if there occurs a drop in hydraulic braking pressure due to the control of antiskid braking during braking which ordinarily causes what is called a "nose-dive" of the car, internal force which acts to cancel or alleviate such a nose-dive is generated, so as to cause pitching of the car which always provides aggravation of a feeling of drive and ride.

SUMMARY OF THE INVENTION

It is an object of the present invention to provide an antiskid braking system which can alleviates a nose-dive of a car during braking and controls an occurrence of pitching motion of the car caused due to the antiskid braking control.

The above object of the present invention is achieved by providing an antiskid braking system for controlling hydraulic braking pressure to alleviate a lock of wheels so as thereby to control the vehicle going into a skid. The antiskid braking system further alters the hydraulic braking pressure by repeating at least a pressure reducing phase and a pressure increasing phase so as to render the wheels locked loosely more for a predetermined leading period of time from a commencement of antiskid braking control than for another period of time of antiskid braking control succeeding to the leading period of time.

The control of hydraulic braking pressure for the gradual alleviation of the wheel lock may be performed in a plurality of consecutive cycles, each cycle including at least a pressure reducing phase and a pressure increasing phase, thereby controlling a skid of the wheels. In this instance, the wheels are rendered to be locked loosely more in the first cycle of antiskid braking control than in any other remaining cycle.

Specifically, in order for the antiskid braking system to render the wheels to be locked loosely for the leading period of time or in the first cycle of antiskid braking control, a timing at which the pressure reducing phase commences may be advanced. Alternatively, a timing at which the pressure increasing phase commences may be retarded.

The antiskid braking system modifies an amount by which the hydraulic braking pressure is altered larger with an increase in deceleration of the vehicle. Together, the antiskid braking system may render the wheels locked loosely only for roads having surface friction higher than a predetermined level on which the vehicle is traveling.

By means of rendering the lock of the wheels loose, i.e. the hydraulic braking pressure rather reduced, for the leading period of time from the commencement of antiskid braking control, or otherwise in the first cycle of antiskid braking control, where pitching motion often occurs, even if a nose-dive of the car occurs due to braking, it is effectively alleviated. Together, since a reduction in hydraulic braking pressure is diminished in the pressure reducing phase, the reaction force acting to cancel the nose-dive is not increased, so as to alleviate pitching of the car which always yields aggravation of a good feeling of drive and ride. Rendering the lock of the wheels loose is not performed for the succeeding period of time of antiskid braking control, the antiskid braking control causes aggravation of the performance of braking.

Achieving the rendering of the lock of the wheels loose, i.e. the hydraulic braking pressure rather reduced, by means of advancing a timing at which the pressure reducing phase commences, or alternatively, by means of retarding a timing at which the pressure increasing phase commences makes the sequence logic of controlling hydraulic braking pressure.

The amount of modification, by which the hydraulic braking pressure is altered, is made larger with an increase in deceleration of the vehicle which has a great adverse effect to nose-dive and pitching during braking, assuring alleviation of nose-dive and pitching. Furthermore, rendering the lock of wheels loose only for roads with high surface friction alleviates a nose-dive of the car on high frictional roads and prevents adverse effects to the performance of braking the car on low frictional roads though pitching of the car is effectively alleviated.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 9 is a driving condition parameter table;

FIG. 10 is a control threshold value table;

FIG. 11 is a threshold value correction table;

DETAILED DESCRIPTION OF THE PREFERRED EMBODIMENTS

Figure 1:
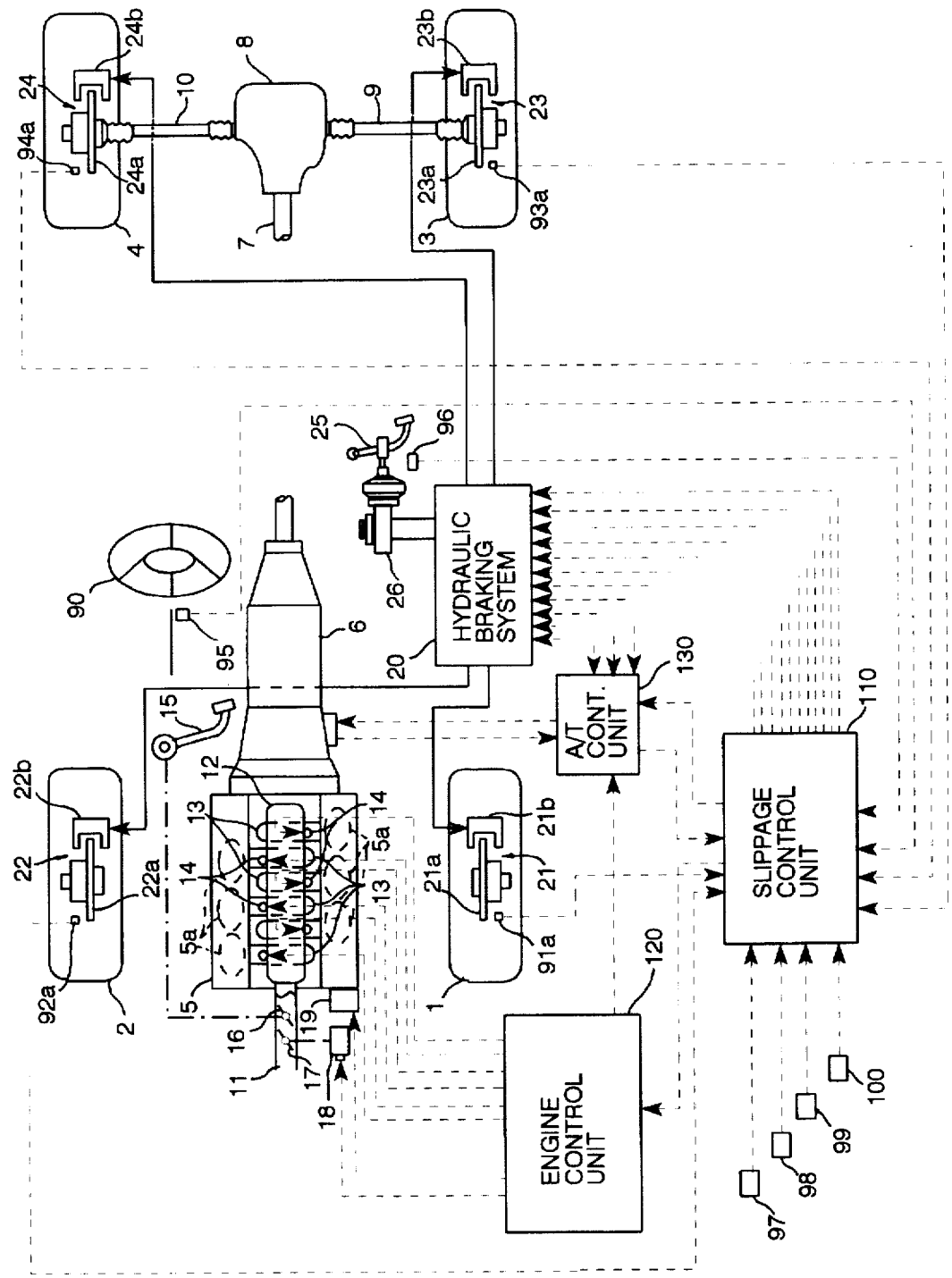
FIG. 1 is a schematic illustration of an antiskid braking system in accordance with an embodiment of the present invention which is incorporated in a front engine-rear drive vehicle.

Referring now to the drawings in detail, and in particular, to FIG. 1 showing a slippage control system for a front engine-rear drive vehicle which includes an antiskid braking apparatus in accordance with an embodiment of the present invention, the vehicle has front driven wheels 1 and 2 and rear drive wheels 3 and 4. The engine output torque is transmitted from an engine 5, such as a V-6 internal combustion engine disposed in an front engine compartment, to the rear drive wheels 4 and 5 through rear axles 9 and 10, respectively, via a propeller shaft 7 and a differential 8. An automatic transmission 6, which may take any type having a planetary gear transmission mechanism and a torque converter well known in the art, is provided between the engine 5 and the propeller shaft 7.

Intake air is introduced into cylinders 5a and 5b through an intake pipe 11 via a surge tank 11 placed above the engine 5. A row of cylinders 5a are respectively connected by individual intake pipes 13 extending from one side of the surge tank 11 remote from the row of cylinders 5a. Similarly, another row of cylinders 5b are respectively connected by individual intake pipes 13 extending from another side of the surge tank 11. Each individual intake pipe 13 is provided a fuel injector 14 for delivering fuel into the individual intake pipe 13 or an intake port (not shown) of the associated cylinder. In the intake pipe 11, there are disposed a primary throttle valve 16 and a secondary throttle valve 17 placed upstream from the primary throttle valve 16. The primary throttle valve 16 is linked with an accelerator pedal 15 so as to change in position. The secondary throttle valve 17 is mechanically coupled to an electric actuator so as to change in position. A distributor 19 provides sparks to the cylinders 5a and 5b in predetermined firing order at a correct ignition timing.

Front and rear wheels 1–4 are provided with brake assemblies 21–24, respectively, actuated by means of a hydraulic braking system 20. These brake assemblies 21–24 may take any known type such as including brake disks 21a–24a secured to the wheels 1–4, respectively, and calipers 21b–24b which shove the brake disks 21a–24a, respectively, so as to brake the respective wheels 1–4.

Figure 2:
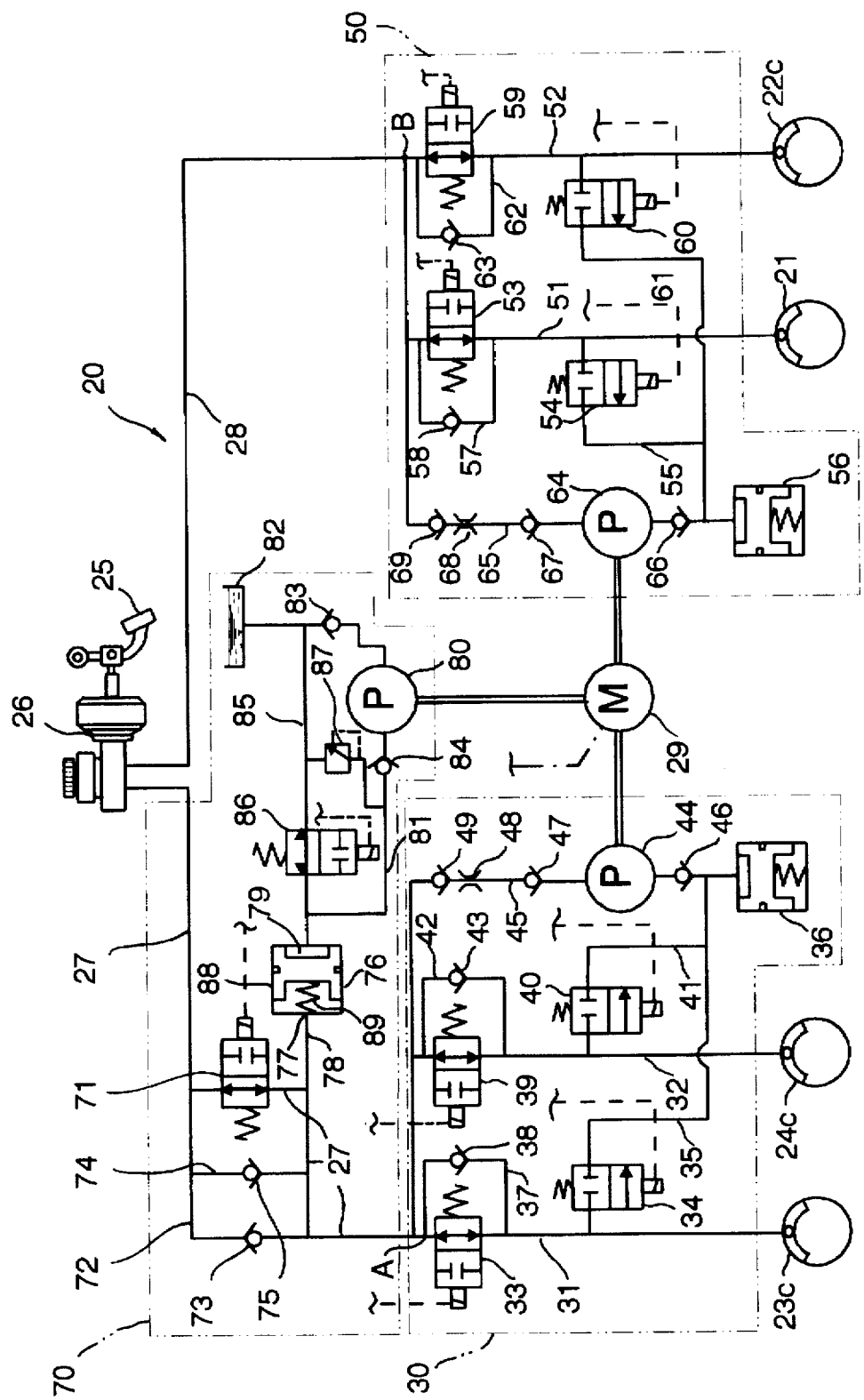
FIG. 2 is a hydraulic control system for the antiskid braking system.

Referring to FIG. 2, the hydraulic braking system 20 is shown, which basically includes a tandem type of master cylinder 26 linked with a brake pedal 25, wheel cylinders 21c–24c for transmitting the master cylinder pressure to the calipers 21b–24b, respectively and forcing them against the brake disks 21a–24a, respectively. A rear main hydraulic fluid line 27 extends from the master cylinder 26 and branches off at a juncture point A into two individual hydraulic fluid lines 31 and 32 which in turn extend to the rear wheel cylinders 23c and 24c, respectively. Similarly, a front main hydraulic fluid line 28 extends from the master cylinder 26 and branches off at a juncture point B into two individual hydraulic fluid lines 51 and 52 which in turn extend to the front wheel cylinders 21c and 22c, respectively. The hydraulic braking system 20 further includes rear and front wheels antiskid braking systems 30 and 50 and a rear wheels traction control system 70.

Rear wheel antiskid braking system 30 comprises a hydraulic fluid pump 44 and a number of valves relating to the individual hydraulic fluid lines 31 and 32. The individual hydraulic fluid line 31 is provided with an intensifying valve 33 and a hydraulic fluid return line 35 branching off from the individual hydraulic fluid line 31 downstream from the intensifying valve 33. The hydraulic fluid return line 35, which extends to a fluid reservoir 36, is provided with a reducing valve 34. Return fluid to the fluid reservoir 36 is allowed by means of a check valve 38 provided in a hydraulic fluid bypass line 37 which in turn allows fluid to bypass the intensifying valve 33. Similarly, the individual hydraulic fluid line 32 is provided with an intensifying valve 39 and a hydraulic fluid return line 41 branching off from the individual hydraulic fluid line 32 downstream from the intensifying valve 39. The hydraulic fluid return line 41, which extends to the fluid reservoir 36, is provided with a reducing valve 40. Return fluid to the fluid reservoir 36 is allowed by means of a check valve 43 provided in a hydraulic fluid bypass line 42 which in mm allows fluid to bypass the intensifying valve 39. Each of these intensifying valves 33 and 39 and reducing valves 34 and 40 is of the type such as being actuated by a duty solenoid so as to regulate valve opening precisely.

Hydraulic fluid pump 44 is disposed in a hydraulic fluid line 45 extending from the fluid reservoir 36 and joining the rear main hydraulic fluid line 27 at the juncture point A. The hydraulic fluid line 45 is provided in order from the downstream end with check valves 46 and 47 disposed before and after the hydraulic fluid pump 44, respectively, a throttle valve 48, and a check valve 49.

Front wheels antiskid braking system 50, which is basically similar to the rear wheels antiskid braking system 30, includes a hydraulic fluid pump 64 and a number of valves relating to the individual hydraulic fluid lines 51 and 52. The individual hydraulic fluid line 51 is provided with an intensifying valve 53 and a hydraulic fluid return line 55 branching off from the individual hydraulic fluid line 51 downstream from the intensifying valve 53. The hydraulic fluid return line 55, which extends to a fluid reservoir 56, is provided with a reducing valve 54. Return fluid is allowed only to the fluid reservoir 56 by means of a check valve 58 provided in a hydraulic fluid bypass line 57 which in turn allows fluid to bypass the intensifying valve 53. Similarly, the individual hydraulic fluid line 52 is provided with an intensifying valve 59 and a hydraulic fluid return line 61 branching off from the individual hydraulic fluid line 52 downstream from the intensifying valve 59. The hydraulic fluid return line 61, which extends to the fluid reservoir 56, is provided with a reducing valve 60. Return fluid is allowed only to the fluid reservoir 56 by means of a check valve 63 provided in a hydraulic fluid bypass line 62 which in turn allows fluid to bypass the intensifying valve 59. Each of these intensifying valves 53 and 59 and reducing valves 54 and 60 is of the type such as being actuated by a duty solenoid so as to regulate valve opening precisely.

Hydraulic fluid pump 64 is disposed in a hydraulic fluid line 65 extending from the fluid reservoir 56 and joining the front main hydraulic fluid line 28 at the juncture point B. The hydraulic fluid line 65 is provided in order from the downstream end with check valves 66 and 67 disposed before and after the hydraulic fluid pump 64, respectively, a throttle valve 68, and a check valve 69.

Rear wheels traction control system 70 basically comprises an intensifying cylinder 76, a hydraulic fluid pump 80 and a number of valves. The rear main hydraulic fluid line 27 is provided with a shut-out valve 71 for opening and shutting out the rear main hydraulic fluid line 27. A hydraulic fluid bypass line 72, which in turn allows fluid to bypass the shut-out valve 71, is provided with a check valve 73 for allowing fluid flow downward only. Another hydraulic fluid bypass line 74, which is in parallel with the hydraulic fluid bypass line 72, is provided with a check valve 75 for allowing fluid flow upward only when the pressure of hydraulic fluid is higher than a braking force occurring during brake traction controlling. The intensifying cylinder 76, which intensifies the hydraulic fluid pressure in the rear main hydraulic fluid line 27 during brake traction controlling, has an inlet port 77 connected to the rear main hydraulic fluid line 27 through a hydraulic fluid line 78 and a hydraulic fluid pressure chamber 79 connected to a reservoir 82 through a hydraulic fluid line 81 provided with the hydraulic fluid pump 80 and through a hydraulic fluid return line 85 provided with a control valve 86. The hydraulic fluid line 81 is provided in order from the side of the reservoir 82 with check valves 83 and 84 before and after the hydraulic fluid pump 80, respectively. A relief valve 87 is provided between the hydraulic fluid lines 81 and 85 so as to relieve a predetermined level of pressure. Each of the shut-out valve 71 and control valve 86 is of the type such as being actuated by a solenoid so as to shut the associated hydraulic fluid line. A piston 88 of the intensifying cylinder 76 is ordinarily urged toward the hydraulic fluid pressure chamber 79 by a return spring 89 and is forced against the return spring 89 by means of supply of hydraulic fluid pressure into the hydraulic fluid pressure chamber 79 so as to discharge hydraulic fluid pressure into the rear main hydraulic fluid line 27.

In the hydraulic braking system 20, the hydraulic fluid pumps 44, 64 and 80 are mechanically coupled to and driven by an electric motor 29.

Referring back to FIG. 1, the vehicle is provided with various sensors and switches, such as wheel speed sensors 91a–94a, a steering angle sensor 95, a brake switch 96, an engine speed sensor 97, an accelerator position sensor 98, a throttle position sensor 99 and a drive mode selection switch 100. The wheel speed sensors 91a–94a detect rotational speeds of the wheels 1-4, respectively. Each of the wheel speed sensors 91a–94a is of the type having an electronic pick up device for detecting a plurality of members arranged at regular distances on or in close proximity to the brake disk. The steering angle sensor 95 detects the angle of steering through which a steering wheel 90 is operated or turned. The brake switch 96 is disposed in position relative to a brake pedal 25 so as to turn on and provide a brake application signal during operation of the brake pedal 25. The engine speed sensor 97 detects the speed of rotation of the engine 5. The accelerator position sensor 98 is disposed in position relative to an accelerator pedal 15 so as to detect the stroke of depression of the accelerator pedal 15. The throttle position sensor 99 detects the position of opened position of the primary throttle valve 16. The drive mode selection switch 100 is operated to select desired one of drive modes including a sporting drive mode, an ordinary drive mode and a safety drive mode. Various types of sensors and switches are well known in the art and these sensors and switches may take any known types.

Braking system includes control units, namely a slippage control unit 110 for performing antiskid braking control and rear brake traction control, an engine control unit 120 for controlling operation of the engine 5 and a transmission control unit 130 for controlling operation of the automatic transmission 6, all of which mainly comprise microcomputers, respectively. The engine control unit 120 receives various signals from an intake air flow sensor and a shift position sensor (not shown) in addition to the wheel speed sensors 91a–94a, the engine speed sensor 97, the throttle position sensor 99 and so forth. The transmission control unit 130 receives various signals relating to temperature and pressure of working oil in the automatic transmission 6, a speed of the vehicle, position of a shift lever (not shown), position of the primary throttle valve 16 and so forth.

Slippage control unit 110 provides for the engine control unit 120 a control signal necessary for engine traction control, and, based on the traction control signal, the engine control unit 120 controls the actuator 10 to regulate the secondary throttle valve 17 and further provides for the hydraulic braking system 20 control signals necessary for brake traction control and antiskid braking control. The slippage control unit 110 thus functioning comprises a wave-form shaping circuit for shaping wave-forms of signals from various sensors and switches if necessary, an A/D converter for A/D conversion of signals from various sensors and switches, an input-output interface, a drive circuit for the various valves and the motor 29 and a plurality of times. The microcomputer of the slippage control unit 110 has a read only memory (ROM) for storage of various control programs for traction control, antiskid braking control and associated controls, look-up tables and maps and a random access memory (RAM) including various work memories.

For the antiskid braking control, the slippage control unit 110 receives signals representative of wheel speeds V1-V4 from the wheel speed sensors 91a–94a, respectively and, on the basis of these wheel speeds V1-V4, calculates acceleration AV1-AV4 or deceleration DV1-DV4 of these wheels 1–4, respectively. Current acceleration or current deceleration of each wheel is defined as acceleration or deceleration of gravity into which the result of a division of the difference of a current wheel speed from the preceding wheel speed by a sampling period Δt, for instance 8 ms, is converted. Further, a road condition judgement is made as to whether a road surface on which the vehicle is traveling is in good condition or in bad condition. In this instance, in order to make the road condition judgement, the number of times that the acceleration of each front driven wheel 1, 2 or the deceleration of each front driven wheel 1, 2 exceeds a threshold value in a predetermined period of time is counted. If the number of times is less than a specified number of times, the road surface is determined to be in good condition and a road condition flag Fak is down or reset to a state of "0." On the other hand, if the number of times is greater than the specified number of times, the road surface is determined to be in bad condition and the road condition flag Fak is up or set to a state of "1."

As described later, the antiskid braking control is performed individually for the brake assemblies 21–24. Briefly describing, the antiskid braking control is performed on the basis of a presumption of vehicle speed Vr from wheel speed and road surface friction. Wheel slippage rate is defined in this embodiment as a percentage of the wheel speed relative to the vehicle speed (Wr/Vr×100)—the larger the difference of the wheel speed from the vehicle speed, the greater the wheel slippage tends to occur.

Figure 3:
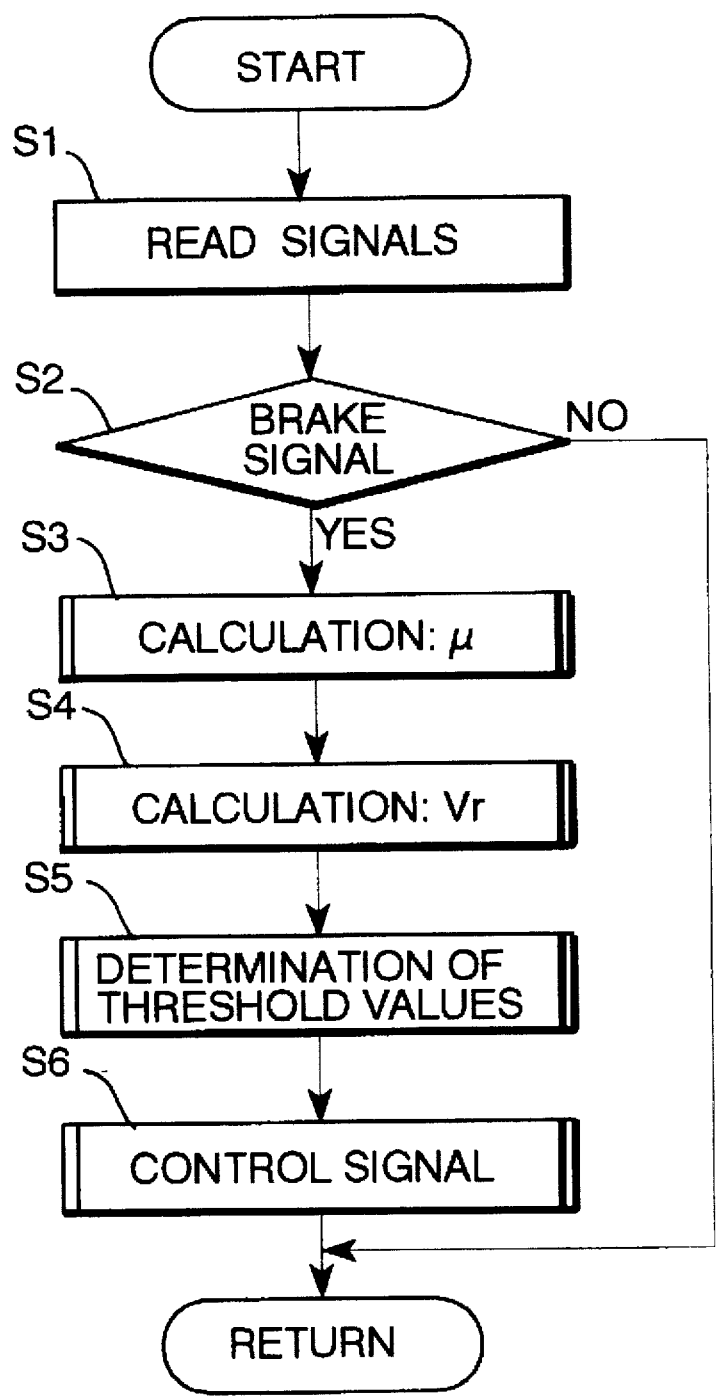
FIG. 3 is a flow chart illustrating a general or main sequence routine of antiskid braking control.

Referring to FIG. 3, which is a flow chart illustrating the main or general sequence routine of antiskid braking control for, e.g., the front driven wheel 1, which is repeated every short period of, for instance, 8 ms, the first step at step S1 is to read various signals including at least a brake application signal and a wheel speed signal from the brake switch 96 and the wheel speed sensor 91a, respectively. Subsequently, a decision is made at step S2 as to whether there is a brake application signal. If the answer to the decision is "NO," this indicates that the brake pedal 25 is not operated or depressed and the brake switch 96 is kept turned off, then, the routine orders return. On the other hand, if the answer to the decision is "YES," this indicates that the brake pedal 25 is operated or depressed and the brake switch 96 is turned on, then, subroutines are consecutively carded out to calculate or determine the level of road surface friction Mu1 for the front driven wheel 1, a vehicle speed Vr and various control thresholds at steps S3, S4 and S5, respectively. Thereafter, a control signal is provided at step S6.

In the calculation subroutine for calculating the level of road surface friction Mu1 performed at step S3, a road surface frictional coefficient μ is calculated from a wheel speed V1 and acceleration Vg of the front wheel 1. In order to obtain acceleration Vg, a 100 ms timer and a 500 ms timer are used. That is, within 500 ms after the commencement of acceleration in which the acceleration Vg is not sufficiently large, a change in the wheel speed V1 for a period of 100 ms is sampled every period of 100 ms. Based on the sampled change of the current wheel speed V1(i) from the wheel speed V1(i−100) at a time 100 ms earlier from now, the acceleration Vg is obtained from the following equation:

$$Vg = K1 \cdot [V1(i) - V1(i-100)]$$

After the lapse of 500 ms necessary for the front wheel 1 to get accelerated sufficiently, a change in the wheel speed V1 for a period of 500 ms is sampled every period of 100 ms. In the case, based on the sampled change of the current wheel speed V1(i) from the wheel speed V1(i−500) at a time 500 ms earlier from now, the acceleration Vg is obtained from the following equation:

$$Vg = K2 \cdot [V1(i) - V1(i-500)]$$

In the above equations, K1 and K2 are invariable.

Figures 4, 6:
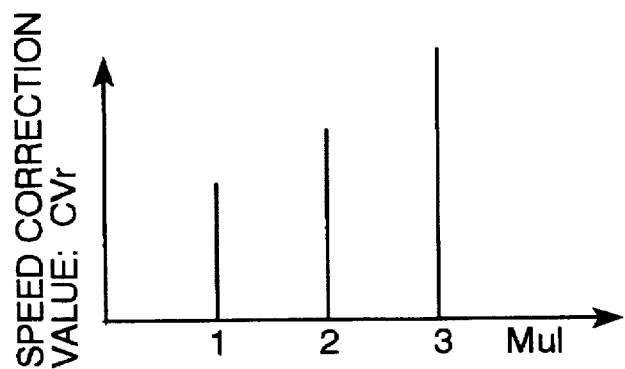
FIG. 4 is a frictional coefficient table defining road surface frictional coefficients in five levels according to wheel speed and wheel acceleration.
FIG. 6 is a vehicle speed correction factor map.

A road surface frictional coefficients μ is found by looking up or searching a frictional coefficient map containing applicable road surface frictional coefficients μ and by three dimensional interpolation according to wheel speeds V1 and wheel acceleration Vg. As shown in FIG. 4, the frictional coefficient table defines road surface frictional coefficients μ in five levels from 1.0 to 5.0 according to wheel speeds V1 and wheel acceleration Vg.

Road surfaces are divided into three levels of frictional conditions, namely a low road surface friction level (Mu=1) of road surfaces which have friction coefficients μ between 1.0 and 2.5, a moderate road surface friction level (Mu=2) of mad surfaces which have road surface friction coefficients μ between 2.5 and 3.5 and a high mad surface friction level (Mu=3) of road surfaces which have road surface friction coefficients μ between 3.5 and 5.0.

Figure 5:
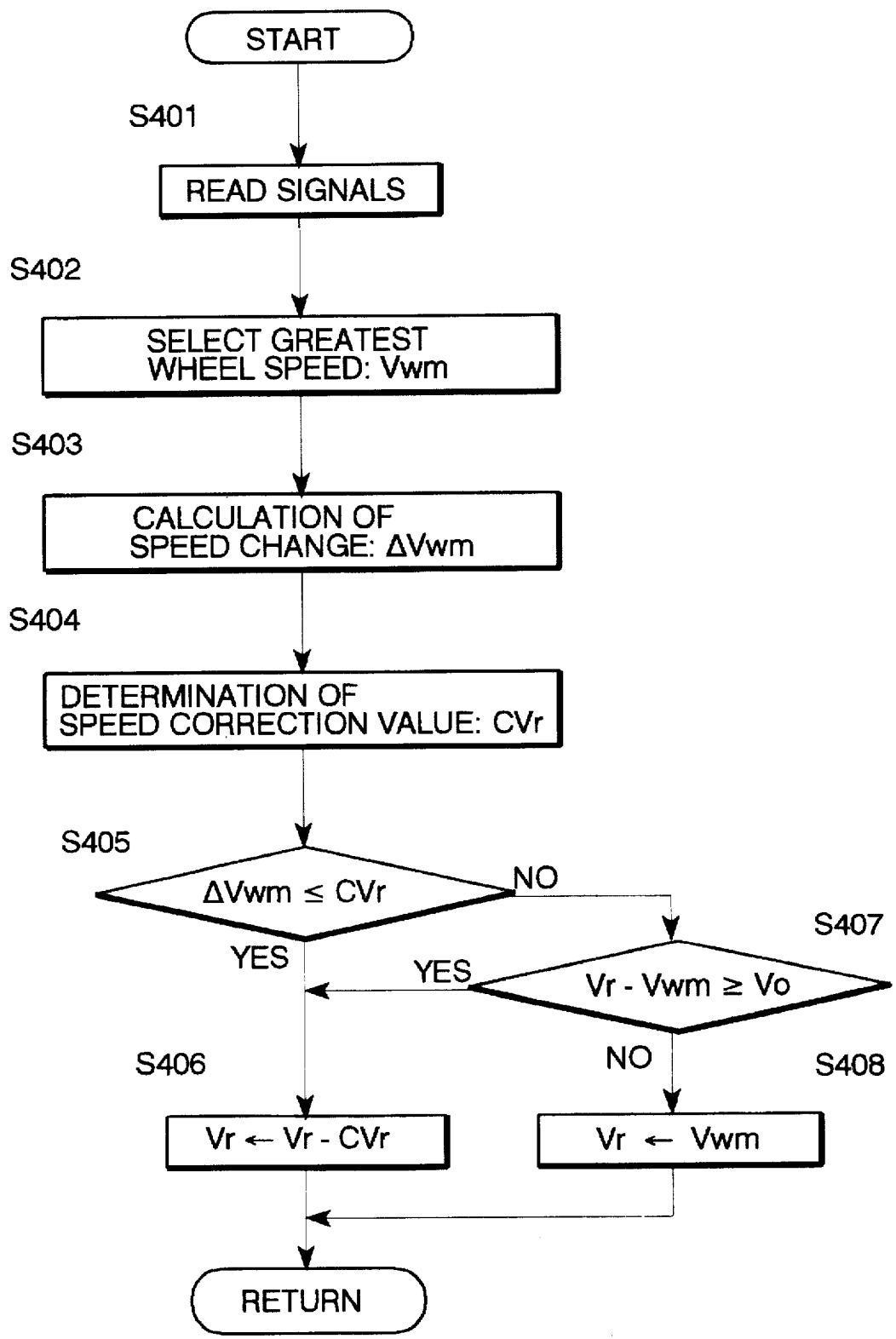
FIG. 5 is a flow chart of a vehicle speed calculation subroutine.

Referring to FIG. 5, which is a flow chart illustrating the subroutine of vehicle speed presumption, the vehicle speed calculation subroutine commences and control proceeds directly to step S401 where various signals, including wheel speeds V1–V4, the road surface friction levels Mu1–Mu4, the preceding presumptive vehicle speed Vr, are read. After taking either one of the wheel speeds V1–V4, which is larger than the others, as a substantial wheel speed Vwm at step S402, a wheel speed change ΔVwm in the substantial wheel speed Vwm per a sampling period Δt is calculated at step S403. Subsequently, at step S404, a vehicle speed correction factor map such as shown in FIG. 6 is searched to find a vehicle speed correction factor CVr according to the road surface friction level Mu1. Thereafter, a decision is made at step S405 as to whether the wheel speed change ΔVwm is less than the vehicle speed correction factor CVr.

If the answer to the decision is "YES," a speed resulting from subtracting the vehicle speed correction factor CVr from the preceding presumptive vehicle speed Vr is presumed as and substituted for a current presumptive vehicle speed Vr at step S406. This presumption causes the vehicle speed Vr to decline at an invariable rate equal to the vehicle speed correction factor CVr. On the other hand, if the answer to the decision is "NO," this indicates that the wheel speed Vwm changes in excess, then, another decision is made at step S407 as to whether the difference of the presumptive vehicle speed Vr from the wheel speed Vwm is greater than a predetermined value Vo, i.e. whether there is a great difference between the presumptive vehicle speed Vr and the wheel speed Vwm. If the answer to the decision is "YES," this indicates that there is in fact a great difference between the presumptive vehicle speed Vr and the wheel speed Vwm, then, a speed resulting from subtracting the vehicle speed correction factor CVr from the preceding presumptive vehicle speed Vr is presumed as and substituted for a current vehicle speed Vr at step S406. However, if the answer to the decision is "NO," this indicates that the presumptive vehicle speed Vr is relatively close to the wheel speed Vwm, then, the wheel speed Vwm is presumed as and substituted for a vehicle speed Vr at step S408. In such a manner, the presumptive vehicle speed Vr changes according to the wheel speeds V1–v4 momentarily.

Figure 7:
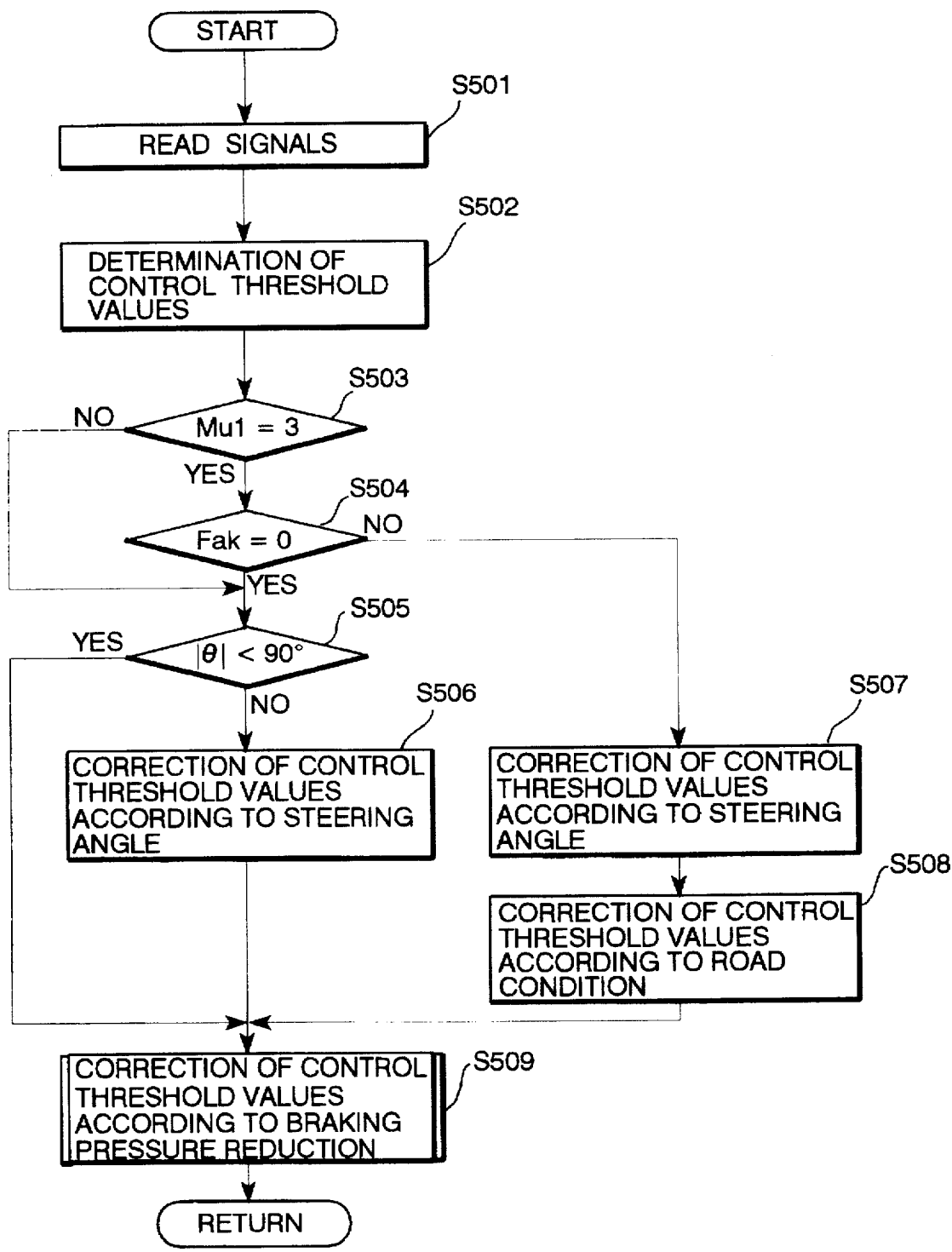
FIG. 7 is a flow chart illustrating a subroutine of control threshold value determination.
Figure 8:
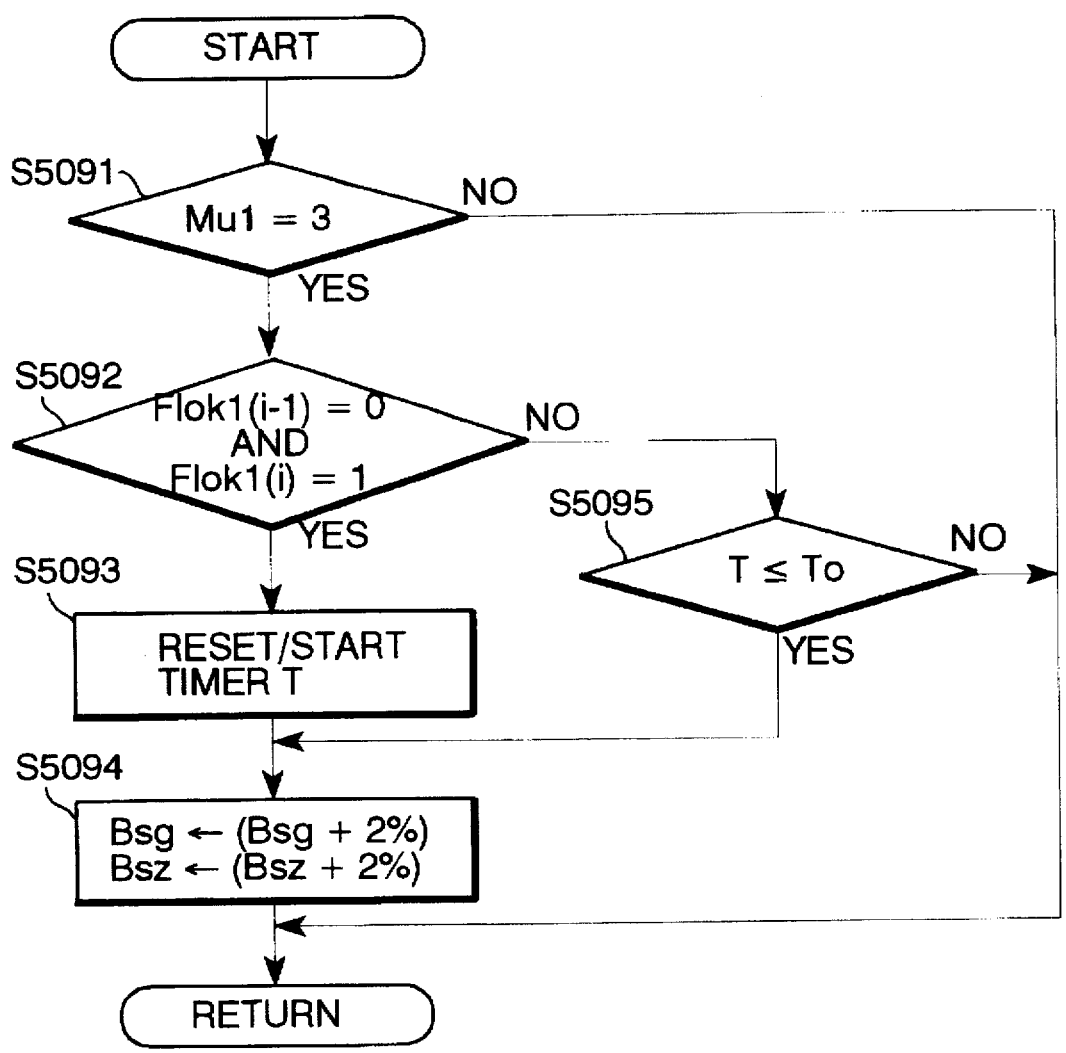
FIG. 8 is a flow chart illustrating a subroutine of control threshold value correction.

Referring to FIGS. 7 and 8, which are flow charts illustrating the subroutines of control threshold value determination and correction, the first step at step S501 in FIG. 7 is to read various signals, including the presumptive vehicle speed Vr, the road surface friction levels Mu1–Mu4, a steering angle θ, the road condition flag Fak and a brake lock flags Flok1 with regard to the front driven wheel 1. Subsequently, various control thresholds are determined at step S502. Specifically, a driving condition parameter M is found by searching a driving condition parameter table according to road condition, vehicle speed Vr and road surface friction level Mu as parameters as shown in FIG. 9 and, on the basis of the driving condition parameter M, various control threshold values are found by searching a control threshold value table as shown in FIG. 10 and stored in the work memories. In this instance, either one of the road surface friction levels Mu1–Mu4 for the wheels 1–4, which is less than the others, is taken as a substantial road surface friction level Mu used in the driving condition parameter map shown in FIG. 9. For instance, for the low road surface friction level (Mu=1), the driving condition parameter M is LM 1, LM 2 and LM 3 for the high speed range, the moderate speed range and the low speed range, respectively, if the road surface is in good condition (Fak=0). On the other hand, if the road surface is in bad condition (Fak=1), the driving condition parameter M depends upon vehicle speeds Vr only and are regardless of road surface friction levels. This is because changes in wheel speed are significant and, consequently, the road surface friction coefficient μ of road surface is apt to be presumed to be small.

Figure 13:
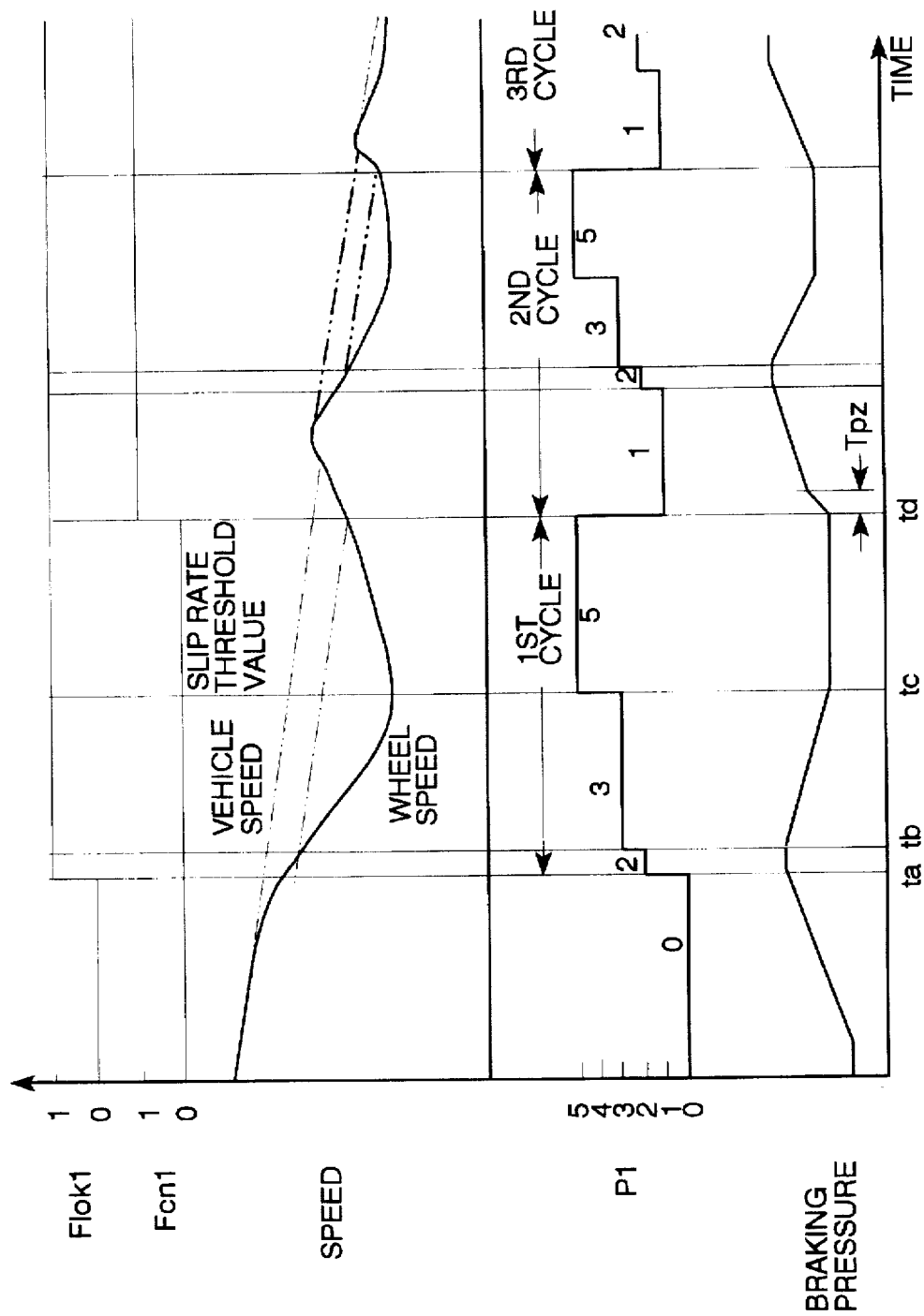
FIG. 13 is a time chart showing the operation of antiskid braking control.

Control threshold value map shown in FIG. 10 defines various control threshold values, such as a I–II deceleration threshold value B12 for making a judgement of changeover from a phase I to a phase II, a II–III slippage rate threshold value Bsg for making a judgement of changeover from the phase II to a phase III, a III–V deceleration threshold value B35 for making a judgement of changeover from the phase III to a phase V, and a V–I slippage rate threshold value Bsz for making a judgement of changeover from the phase V to the phase I (see FIG. 13). These deceleration threshold values B12 and B35, which in turn have great effects to braking force, are established to be as close as possible with a decline in the road surface friction level Mu, i.e. the road surface friction coefficient μ, in order to make braking performance under high road surface friction coefficients μ and the responsiveness of brake control under low road surface friction coefficients μ to be compatible. In this instance, for the driving condition parameter of LM 2, values found from the control threshold value map shown in FIG. 10 are –0.5G, 90%, 0G and 90% as the threshold values B12, Bsg, B35 and Bsz, respectively.

Subsequently, a decision is made at step S503 as to whether the road surface is at the high friction level Mu (i.e. Mu1) of 3. If the answer to the decision is "YES," then, a decision is made at step S504 as to whether the road condition flag Fak has been down or reset to the state of "0" indicating good road condition. If either the answer to the decision regarding the high road surface friction level Mu is "NO" or the answer to the decision regarding road condition is "YES," another decision is made at step S505 as to whether the steering wheel 90 is turned through an angle θ less than 90° in any direction. If the steering angle θ is greater than 90°, a control threshold value correction is made according to the steering angle θ by looking up or searching a threshold value correction table shown in FIG. 11 at step S506. Specifically, if the road surface is at the low friction level Mu 1 or the moderate friction level Mu 2 regardless of road surface condition and if the road surface is at the high friction level Mu 3 and in good condition, the slippage rate threshold values Bsg and Bsz are changed by an increment of, for instance, 5% for the purpose of providing reliable steering.

If the answer to the decision regarding road condition is "NO," i.e. if the road surface is in bad condition, a control threshold value correction is made by looking up or searching the threshold value correction map shown in FIG. 11 at step S507. That is, the slippage rate threshold values Bsg and Bsz are changed by a decrement of by 5% for steering angles θ less than 90°. However, the slippage rate threshold values Bsg and Bsz are not changed for steering angles θ greater than 90°. Together, at step S508, the deceleration threshold value B12 is changed by a decrement of, for instance, 1.0G regardless of steering angles θ. This correction is made to yield a delay of control responsiveness so as to provide assured braking force and is in particular effective when the wheel speed sensors 91a–94a possibly cause errors of speed detection due to bad roads.

Subsequent to the correction of threshold values either at step S506 or at step S508 or if the answer to the decision regarding the steering angle θ is "YES," i.e. the steering wheel 90 is turned through an angle less than 90°, another correction of these control threshold values is made to reduce hydraulic braking pressure so as to alleviate what is called a nose-dive of the car during braking and control prevent pitching of the car due to antiskid braking control.

FIG. 8 is a flow chart illustrating the sequence subroutine of threshold value correction for hydraulic braking pressure control. The first step at step S5081 is to make a decision as to whether the road surface is at the high friction level Mu (i.e. Mu1) of 3. If the answer to the decision is "YES," a decision is further made at step S5082 as to whether the brake lock flag Flok1 is changed from a state of "0" in the preceding sequence (i–1) to a state of "1" in the current sequence (i). If the answer to the decision is "YES, this indicates that the antiskid braking control is currently started for the brake 21 of the front driven wheel 1, then, at step S5083, a timer T, such as a 1000 ms count timer, is reset and starts to count a time developing from the beginning of the antiskid braking control. Subsequently, at step S5084, the slippage rate threshold values Bsg and Bsz are changed by an increment of, for instance, 2%.

If, after once the antiskid braking control has started, the answer to the decision is "NO," another decision is made at step S5085 as to whether the timer has not yet counted up a predetermined time To, for instance 1000 ms. If the answer to the decision is "YES," i.e. the predetermined time has not yet counted up, then, at step S5084, the slippage rate threshold values Bsg and Bsz are changed by an increment of 2%. However, if the predetermined time has counted up, the threshold value correction is not made.

Increasingly correcting the slippage rate threshold value Bsg for the predetermined period of time To from the beginning of antiskid braking control advances the commencement of pressure control so that the hydraulic braking pressure is rather reduced, and hence the wheel is locked rather light. Together, increasingly correcting the slippage rate threshold value Bsz retards the commencement of pressure increase so that the brake is locked rather light. That is, regulating the hydraulic braking pressure so as to lock the brake rather light alleviates a nose-dive of the car during braking and, in addition, lowering a reduction in the hydraulic braking pressure during the antiskid braking control, which allows a decline of braking force acting to alleviate a nose-dive, prevents pitching of the car. In the sequence subroutine of threshold value correction for hydraulic braking pressure control, the correction may be made for either one of the slippage rate threshold values Bsg and Bsz only.

Figure 12B:
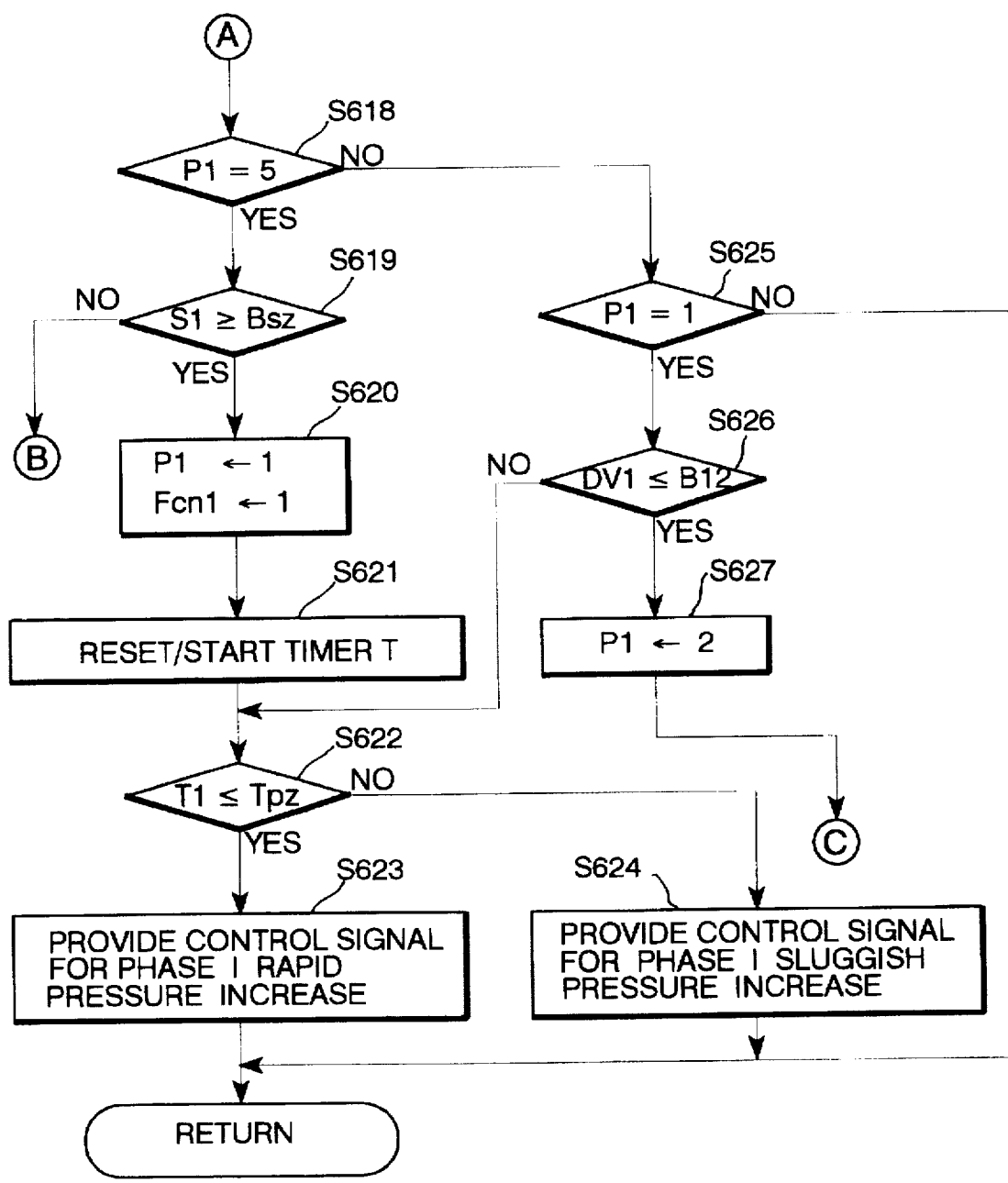
FIG. 12 shows the arrangement of FIGS. 12A and 12B.
FIGS. 12A and B are flow charts illustrating a subroutine of providing a brake control signal.

Referring to FIGS. 12A and 12B which are flow charts of the sequence subroutine of providing a brake control signal at step S6 in FIG. 3, after having read various signals at step S601, a decision is made at step S602 as to whether there is a brake application signal. If there is no brake application signal, after resetting a phase flag Fph1, a brake lock flag Flok1 and a continuation flag Fcn1 to their states of "0" at step S603, the sequence subroutine returns.

On the other hand, if the answer to the decision is "YES," i.e. there is a brake application signal, a decision is made at step S604 as to the vehicle speed Vr and the speed V1 of the driven wheel 1 are less than predetermined speeds C1 and C2, respectively. In this instance, the speeds C1 and C2 are predetermined to be, for instance, 5.0 km/h and 2.5 km/h, respectively. If the answer to the decision is "YES," this indicates that the vehicle has been sufficiently decelerated and it is not necessary to perform the antiskid braking control for the front driven wheel 1, consequently, then, after resetting the flags Fph1, Flok1 and Fcn1 to the states of "0" at step S603, the sequence subroutine returns. However, if the answer to the decision is "NO," a decision is made at step S605 as to whether the brake lock flag Flok1 has been down or reset to the state of "0." If the answer to the decision is "YES," this indicate that the brake has not been locked, i.e. the antiskid braking control has not commenced, then, a decision is made at step S606 as to whether there has occurred a speed reduction or deceleration of gravity DV1 in the wheel speed V1 less than a predetermined deceleration of gravity Do. In the case where there has occurred a deceleration of gravity DV1 less that the predetermined deceleration of gravity Do, after setting the brake lock flag Flok1 and phase flag Fph1 to the state of phase I and the state of phase II in order at steps S607 and S608, respectively, brake control signals predetermined for the increased pressure holding phase II are provided for the intensifying valve 53 and reducing valve 54, respectively, at step S609. In the increased pressure holding phase II, the brake control signals actuate on the associated duty solenoids so as to maintain these valves 53 and 54 shut down so as to hold the hydraulic braking pressure at an increased level.

On the other hand, if the answer to the decision made at step S605 is "NO," this indicates that the antiskid braking control has commenced, then, another decision is made at step S610 as to whether the phase flag Fph1 has been set to the state of phase II. If "YES," a decision is subsequently made at step S611 as to whether the slippage rate S1 of the front driven wheel 1 is less than the II-III slippage rate threshold value Bsg for the judgement of changeover from the phase II to the pressure reducing phase III. Because the slippage rate S1 is always larger than the II-III slippage rate threshold value Bsg at the beginning of the antiskid braking control, brake control signals predetermined for the increased pressure holding phase II are provided for the intensifying valve 53 and reducing valve 54, respectively, at step S609. For an early period of the antiskid braking control, brake control signals predetermined for the increased pressure holding phase II are repeatedly provided. When the slippage rate S1 becomes less than the II-III slippage rate threshold value Bsg, after causing a changeover to the pressure reducing phase III where the hydraulic braking pressure is reduced, with the phase flag Fph1 set to the state of phase III at step S612, another brake control signals predetermined for the pressure reducing phase III are provided for the intensifying valve 53 and reducing valve 54, respectively, at step S613. In the pressure reducing phase III, while, on one hand, the intensifying valve 53 is maintained shut down, the reducing valve 54 is opened at a predetermined duty rate so as to decrease the hydraulic braking pressure.

If the answer to the decision made at step S610 is "NO," a decision is made at step S614 as to whether the phase flag Fph1 has been set to the state of "3" indicative of the phase III. If "YES," another decision is subsequently made at step S615 as to whether the deceleration of gravity DV1 of the front driven wheel 1 is less than the III-V deceleration threshold value B35 for the judgement of changeover from the pressure reducing phase III to the reduced pressure holding phase VI. Because the deceleration of gravity DV1 is larger than the III-V deceleration threshold value B35 at the beginning, the answer to the decision is always "NO," then, brake control signals predetermined for the pressure reducing phase III are provided for the intensifying valve 53 and reducing valve 54, respectively, at step S613. For an early period of the antiskid braking control, brake control signals predetermined for the pressure reducing phase III are repeatedly provided. When the deceleration of gravity DV1 becomes less than the III-V deceleration threshold value B35, after a changeover to the reduced pressure holding phase V where the hydraulic braking pressure is held at the reduced level, with the phase flag Fph1 set to the state of phase V at step S616, another brake control signals predetermined for the reduced pressure holding phase V are provided for the intensifying valve 53 and reducing valve 54, respectively, at step S617. In the reduced pressure holding phase V, the valves 53 and 54 are maintained shut down.

Further, if the answer to the decision made at step S614 regarding the state of phase III of phase flag Fph1 is "NO," then, a decision is made at step S618 in FIG. 12B as to whether the phase flag Fph1 has been set to the state of phase V. If "YES," another decision is made at step S619 as to whether the slippage rate S1 of the front driven wheel 1 is greater than the V-I slippage rate threshold value Bsz for the judgement of changeover from the reduced pressure holding phase V to the pressure increasing phase I. Because the slippage rate S1 is less than the V-I slippage rate threshold value Bsz at the beginning, the answer to the decision is always "NO," then, brake control signals predetermined for the reduced pressure holding phase V are provided for the intensifying valve 53 and reducing valve 54, respectively, at step S617. In the reduced pressure holding phase V, when the slippage rate S1 gradually increases and reaches the V-I slippage rate threshold value Bsz, i.e. when the answer to the decision is "YES," after a changeover to the pressure increasing phase I with setting the phase flag Fph1 to the state of phase I and the continuation flag Fcn1 to the state of "1" at step S620, a timer T1 is reset and started to count a time developing from the beginning of pressure increasing phase I at step S621. Subsequently, a decision is made at step S622 as to whether a predetermined time Tpz for the judgement of a period for which the hydraulic braking pressure is increased rapidly. If the timer has not yet count up the predetermined time Tpz, i.e. the answer to the decision is "YES," then, at step S623, brake control signals predetermined for the pressure increasing phase I are provided for the intensifying valve 53 and reducing valve 54, respectively, so as to increase the hydraulic braking pressure rapidly. In the pressure increasing phase I, while, on one hand, the intensifying valve 53 is opened at a predetermined duty rate so as to increase the hydraulic braking pressure rapidly, the reducing valve 54 is maintained shut down.

On the other hand, when the answer to the decision regarding the state of phase V of the phase flag Fph1 made at step S618 is "NO," a decision is made at step S625 as to whether the phase flag Fph1 has been set to the state of phase I. If "YES," another decision is subsequently made at step S626 as to whether the deceleration of gravity DV1 of the front driven wheel 1 is less than the I-II deceleration threshold value B12 for the judgement of changeover from the pressure increasing phase I to the increased pressure holding phase II. Because the deceleration of gravity DV1 is larger than the I-II deceleration threshold value B12 at the beginning, the answer to the decision is always "NO," then, the decision regarding the predetermined time Tpz for the judgement of rapid pressure increasing period is repeatedly made at step S622 as long as the deceleration of gravity DV1 is not less than the I–II deceleration threshold value B12. Once the timer T1 has counted up the predetermined time Tpz, brake control signals predetermined are provided for the intensifying valve 53 and reducing valve 54, respectively, at step S624 to open the intensifying valve 53 at a predetermined duty rate so as to increase gradually the hydraulic braking pressure rapidly and hold the reducing valve 54 shut down.

If the answer to the decision regarding the deceleration of gravity DV1 is "YES," after a changeover to the increased pressure holding phase II with the phase flag Fph1 set to the state of phase II at step S627, brake control signals predetermined for the increased pressure holding phase II are provided for the intensifying valve 53 and reducing valve 54, respectively, at step S609.

The operation of the antiskid braking control, which is carried out the control over the phases of II, phase III, phase V and phase I in order and continues until the brake switch 96 is turned off and when the vehicle speed Vr and the wheel speed V1 of the driven wheel 1 become less than the predetermined speeds C1 and C2, respectively, will be more clearly understood by reviewing a time chart shown in FIG. 13, which is related to the front driven wheel 1, in connection with the above control sequence shown in FIG. 3.

In the case that the antiskid braking control is not carried out during deceleration, when the deceleration of gravity DV1 of the front driven wheel 1 reaches 3G as a result of operating or depressing the brake pedal 25 and gradual intensification of hydraulic braking pressure, the brake lock flag Flok1 is up. The antiskid braking control commences substantially at a time ta the brake lock flag Flok1 is up. In the first cycle of sequence immediately after the commencement of antiskid braking control, the parameter of road surface friction level Mu1 has a value of 3 which indicates high road surface friction coefficients µ and, according to a driving condition parameter M designated according to the high road surface friction level Mu1, the control threshold values are determined. A slippage rate S1 and deceleration of gravity DV1 or acceleration of gravity AV1 of the front driven wheel 1 are compared with their corresponding threshold values. The antiskid braking control shifts to the increased pressure holding phase II where the hydraulic braking pressure is held at an increased level. When the slippage rate S1 declines and reaches less than the II–III slippage rate threshold value Bsg, it shifts to the pressure reducing phase III from the increased pressure holding phase II at a time tb. From the time tb, the hydraulic braking pressure declines at an invariable rate and the front driven wheel 1 is consequently permitted to recover rotation. As a result of a further decline of the hydraulic braking pressure, when the deceleration of gravity DV1 of the front driven wheel 1 reaches the III–V deceleration threshold value B35, which is generally 0G, the antiskid braking control shift to the reduced pressure holding phase V from the pressure reducing phase III at a time tc. During the reduced pressure holding phase V, the front driven wheel 1 increases its wheel speed V1 gradually. As soon as the slippage rate S1 reaches above the V–I slippage rate threshold value Bsz at a time td, a second cycle of control takes place. This forces the antiskid braking control to shift to the pressure increasing phase I following setting up the continuous flag Fcn1. Immediately after the shift to the pressure increasing phase I, the hydraulic braking pressure increases sharply for the period of predetermined time Tpz and subsequently gradually at a rather gentle inclination. Accordingly, immediately after shifting to the second cycle of control, it is provided a reliable increase in the hydraulic braking pressure, ensuring braking force.

Because, after the second cycle of control, an appropriate road surface friction level Mu1 is determined and, on the basis of a driving condition parameter M according to the road surface friction level Mu1 and a vehicle speed Vr, the control threshold values Bsg, Bsz, B12 and B35 are determined, so as to perform precise control of the hydraulic braking pressure according to vehicle driving conditions. If, in the reduced pressure holding phase V during the second cycle of control, the slippage rate S1 becomes above the V–I slippage rate threshold value Bsz, the antiskid braking control shifts to the pressure increasing phase I in another cycle of control.

The sequence subroutine of threshold value correction for hydraulic braking pressure control may be partly varied.

Figure 14:
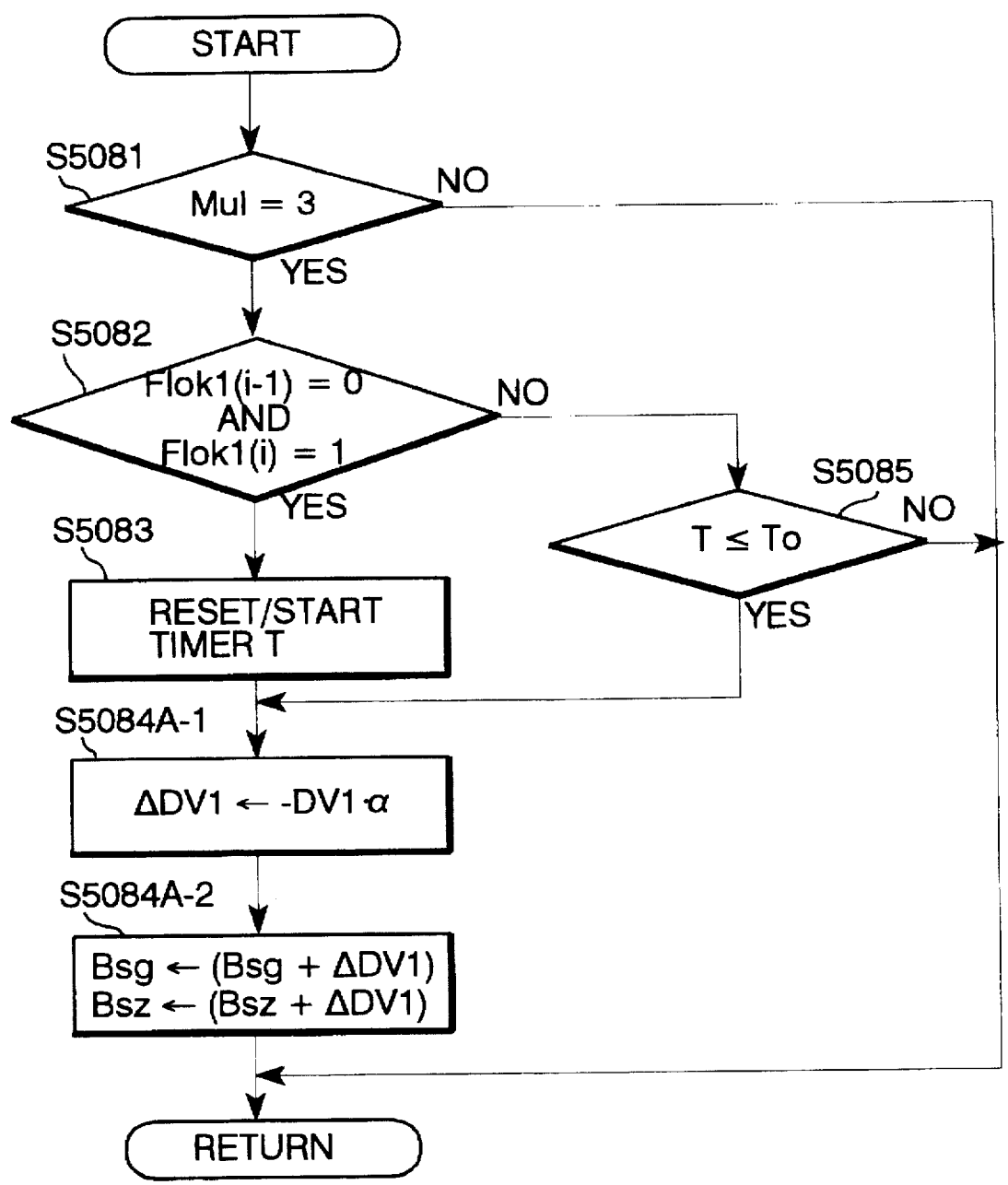
FIG. 14 is a flow chart illustrating a variation of the subroutine of control threshold value correction.

As shown in FIG. 14, the slippage rate threshold values Bsg and Bsz may be variable according to wheel speed changes DV1 in place of being changed by an invariable increment. For example, after resetting and starting the timer T at step S5083, a correction increment ΔDV1 is calculated by multiplying the deceleration of gravity DV1 by a proportional coefficient α (α>0) at step S5084A-1. Thereafter, the slippage rate threshold values Bsg and Bsz are changed by the correction increment of ΔDV1 at step S5084A-2.

While nose dive and pitching of the car is generally enhanced due to large deceleration of gravity DV1 cause, nevertheless, because the correction of the slippage rate threshold values Bsg and Bsz is made by increments proportional to deceleration of gravity DV1, this variation of threshold value correction provides alleviation of nose-dive and pitching of the car regardless of deceleration of gravity DV1.

Figure 15:
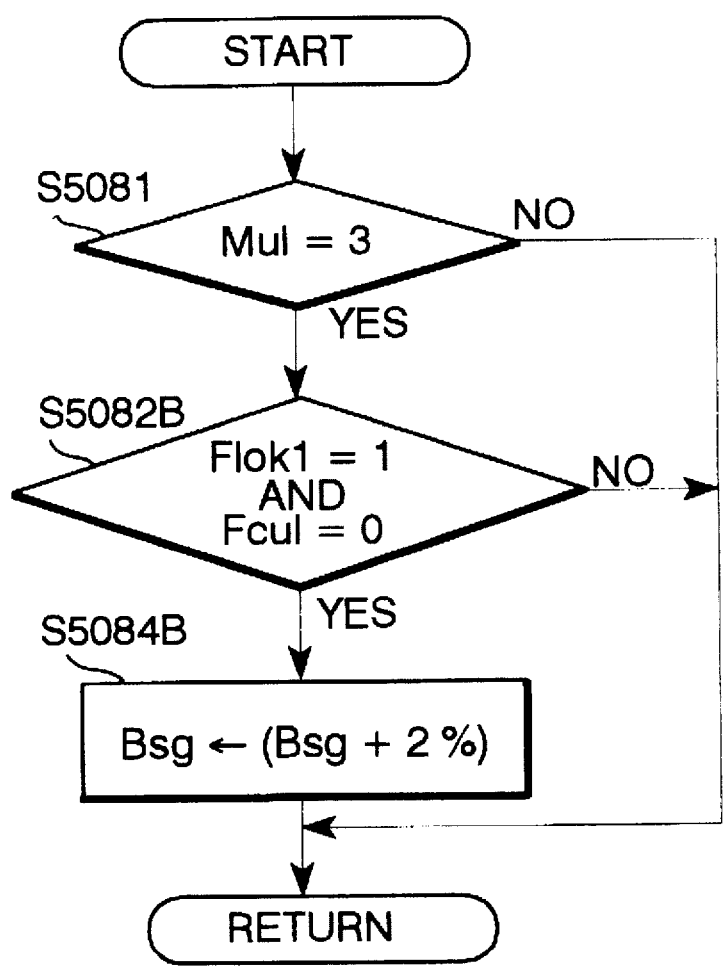
FIG. 15 is a flow chart illustrating another variation of the subroutine of control threshold value correction.

FIG. 15 shows another variation of the sequence subroutine of threshold value correction. In the sequence subroutine, only the II–III slippage rate threshold value Bsg is corrected. That is, if the answer to the decision made at step S5082B as to whether the brake lock flag Flok1 has been up and the continuation flag Fcn1 has been down is "YES, the II–III slippage rate threshold value Bsg is changed by an increment of 2% at step S5084B. If the answer to the decision made at step S5081 or at step S5082B is "NO," the sequence subroutine returns directly.

Figure 16:
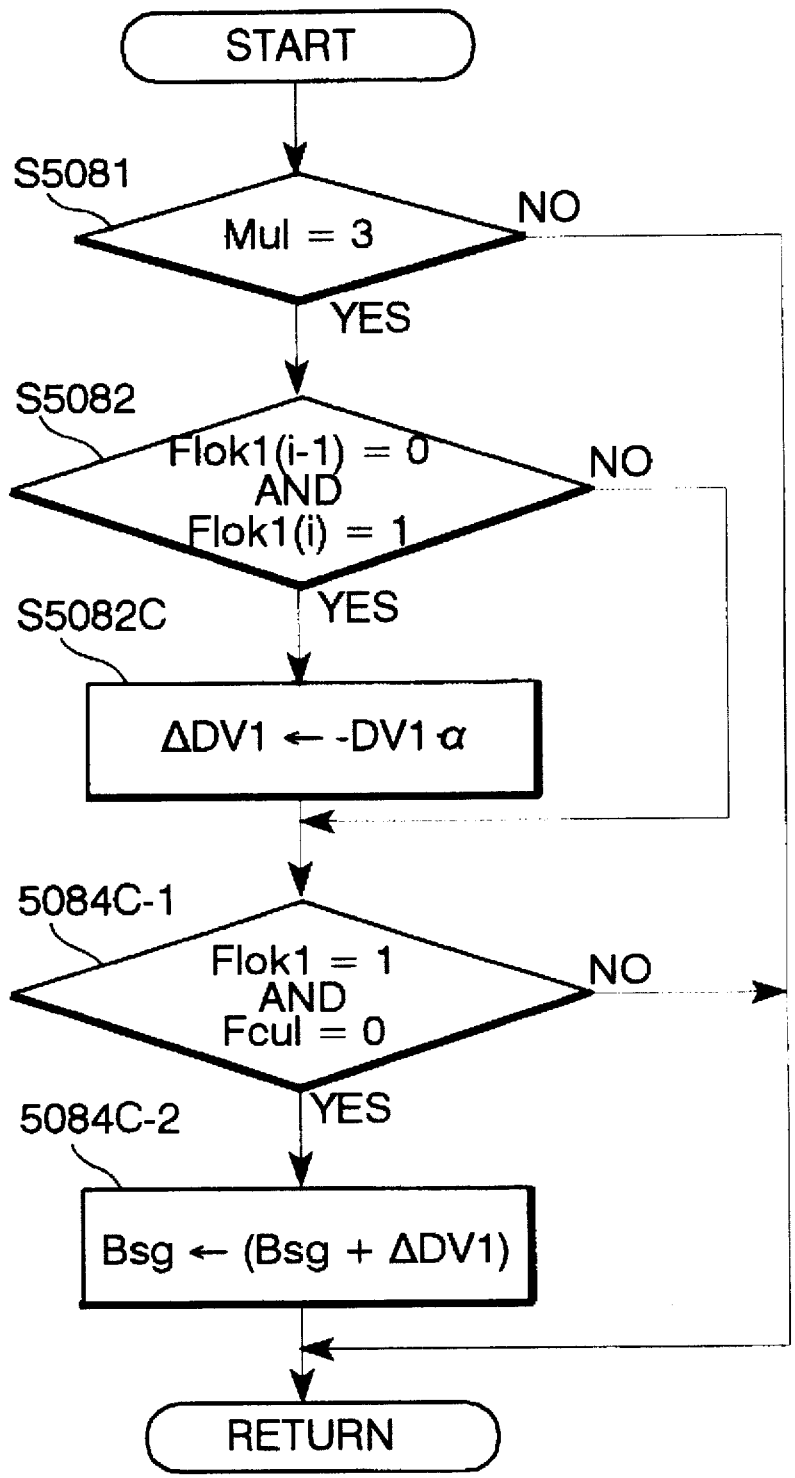
FIG. 16 is a flow chart illustrating still another variation of the subroutine of control threshold value correction.

FIG. 16 shows still another variation of the sequence subroutine of threshold value correction, in which only the II–III slippage rate threshold value Bsg may be variable according to wheel speed changes DV1.

In the sequence subroutine, if the answer to the decision as to whether the road surface is at the high friction level Mu1 of 3 at step S5081 is "YES," a decision is further made at step S5082 as to whether the brake lock flag Flok1 is changed from the state of "0" in the preceding sequence (i–1) to the state of "1" in the current sequence (i). If the answer to the decision is "YES, this indicates that the antiskid braking control is currently started for the brake 21 of the front driven wheel 1, then, at step S5082C, a correction increment ΔDV1 is calculated by multiplying the deceleration of gravity DV1 by a proportional coefficient α (α>0). Either after the calculation of correction increment ΔDV1 at step S5082C or if the answer to the decision made at step S5882 is "NO," another decision is made at step S5084C-1 as to whether the brake lock flag Flok1 has been up and the continuation flag Fcn1 has been down is "YES," the II–III slippage rate threshold value Bsg is changed by the correction increment ΔDV1 at step S5084C-2. If the answer to the decision made at step S5081 or at step S5084C-1 is "NO," the sequence subroutine returns directly.

While nose dive and pitching of the car is generally enhanced due to large deceleration of gravity DV1 cause, nevertheless, because the correction of the slippage rate threshold values Bsg and Bsz is made by increments proportional to deceleration of gravity DV1, this variation of threshold value correction provides alleviation of nose-dive and pitching of the car regardless of deceleration of gravity DV1.

With the antiskid braking control, since the hydraulic braking pressure is regulated for a predetermined period of time To from the commencement of control so as to lock the brake rather light, a nose-dive of the car, which is possibly caused due to braking, is alleviated and pitching of the car is prevented together, preventing aggravation of comfortable feelings of driving and riding.

The antiskid braking control may repeat the pressure increasing phase I and the pressure reducing phase III only.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An antiskid braking system for controlling a vehicle going into a skid comprising:

braking pressure control means for controlling hydraulic braking pressure to alleviate locking of a wheel of the vehicle so as thereby to control a skid of the vehicle; and slippage detecting means for detecting a value relating to slippage of said wheel;

braking pressure altering means for altering said hydraulic braking pressure by repeating a pressure reducing phase and a pressure increasing phase alternatively according to said slippage, said braking pressure altering means controlling said hydraulic braking pressure to shift the antiskid braking system into said pressure reducing phase when said slippage is less than a first specified rate of slippage and into said pressure increasing phase when said slippage is greater than a second specified rate of slippage, and said first specified rate of slippage being set higher in a predetermined period of time from a commencement of antiskid braking control than after said predetermined period of time.

2. An antiskid braking system as defined in claim 1, wherein said braking pressure altering means advances a timing at which said pressure reducing phase commences for said predetermined leading period of time.

3. An antiskid braking system as defined in claim 1, wherein said braking pressure altering means retards a timing at which said pressure increasing phase commences for said predetermined leading period of time.

4. An antiskid braking system as defined in claim 1, wherein said slippage detecting means detects a deceleration rate of said vehicle as said value relating to slippage of said wheel and said braking pressure altering means changes said first specified rate of slippage to become higher with an increase in said deceleration rate.

5. An antiskid braking system as defined in claim 1, wherein said slippage detecting means detects a surface friction coefficient of a road on which said vehicle is traveling, and said braking pressure altering means changes said rate of slippage to a higher rate when said surface friction coefficient is higher than a predetermined surface friction coefficient.

6. An antiskid braking system as defined in claim 1, wherein said first specified rate of slippage and said second specified rate of slippage are equal to each other.

7. An antiskid braking system for controlling a vehicle going into a skid comprising:

braking pressure control means for controlling hydraulic braking pressure to alleviate locking of a wheel of the vehicle gradually in a plurality of consecutive cycles, each of which includes an alternate pressure reducing phase and a pressure increasing phase in order so as thereby to control a skid of the wheel;

slippage detecting means for detecting a value relating to slippage of said wheel; and braking pressure altering means for altering said hydraulic braking pressure so as to cause the antiskid braking system to shift into said pressure reducing phase when said slippage is less than a first specified rate of slippage and into said pressure increasing phase when said slippage is greater than a second specified rate of slippage, and said first specified rate of slippage being set high in an earliest one of said consecutive cycles of antiskid control than in each of the remains of said consecutive cycles.

8. An antiskid braking system as defined in claim 7, wherein said braking pressure altering means advances a timing at which said pressure reducing phase commences for said predetermined period of time.

9. An antiskid braking system as defined in claim 7, wherein said slippage detecting means detects a deceleration rate of said vehicle as said value relating to slippage of said wheel and said braking pressure altering means changes said first specified rate of slippage to become higher with an increase in said deceleration rate.

10. An antiskid braking system as defined in claim 7, wherein said slippage detecting means detects a surface friction coefficient of a road on which said vehicle is traveling, and said braking pressure altering means changes said rate of slippage to a higher rate when said surface friction coefficient is higher than a predetermined surface friction coefficient.

11. An antiskid braking system as defined in claim 7, wherein said first specified rate of slippage and said second specified rate of slippage are equal to each other.

* * * * *